United States Patent [19]

Chigami et al.

[11] Patent Number: 4,840,823
[45] Date of Patent: Jun. 20, 1989

[54] PLASTIC FILM PACKAGING MATERIAL

[75] Inventors: Makoto Chigami; Sumio Ogihara, both of Kanagawa; Hiroshi Hoaki, Tokyo; Tomonobu Kondo, Chiba; Masao Okamura, Kanagawa, all of Japan

[73] Assignees: Kabushiki Kaisha Frontier; Nippon Unicar Kabushiki Kaisha; Nittetsu Kougyo Kabushiki Kaisha, Japan

[21] Appl. No.: 106,268

[22] Filed: Oct. 9, 1987

[51] Int. Cl.$^4$ .................. B65D 81/24; B32B 7/02; C08L 23/04
[52] U.S. Cl. .................. 428/35.5; 428/331; 428/338; 428/339; 428/516; 428/523; 428/35.2; 426/118
[58] Field of Search ............. 428/331, 35, 516, 523, 428/338, 339

[56] References Cited

U.S. PATENT DOCUMENTS 4,277,578  7/1981  Yoshimura et al. ............. 264/557
4,379,197  4/1983  Cipriam et al. ................. 428/220
4,514,465  4/1985  Schoenberg ..................... 428/339

Primary Examiner—P. C. Ives
Attorney, Agent, or Firm—Clement J. Vicari

[57] ABSTRACT

The present invention provides a plastic film packaging material comprising 100 weight parts of a polyethylene resin and 5 to 100 weight parts of an additive comprising a silica containing naturally porous material which is hydrophillic and which has a pore diameter of 15–200Å, a specific surface area of 110 to 130 m$^2$/g, voids of 40 to 50% and a specific gravity of about 1.2.

8 Claims, No Drawings

PLASTIC FILM PACKAGING MATERIAL

FIELD OF THE INVENTION

This invention relates to a plastic film packaging material and more particularly to a plastic film packaging material which can be used for tightly packaging fruit and vegetables while maintaining the freshness of the fruits and vegetables.

BACKGROUND OF THE INVENTION

Recently the demand for fruits and vegetables has increased dramatically with the improvement in feeding levels of the population. To meet such demands, fruits and vegetables are now being shipped from remote places, where the producers are distant from consumers. Accordingly, sometimes the demand and supply for fruits and vegetables become unbalanced. In view of this it is a significant problem to keep fruit and vegetables fresh during temporary storage and during transportation.

Conventionally in order to maintain freshness, it has been the custom to place a freshness retaining agent in the packaged container which holds the fruits or vegetables which retaining agent adsorbs or absorbs the volatile substances produced from the fruits or vegetables so that they are kept from spoiling. This is occasioned by the fact that fruits or vegetables in the packaged container consume oxygen for respiration and generate water vapor, carbonic acid gas, aldehydes, alcohols, esters, ethylene gas, etc. Since the packaged container is closed tightly there is no air flow in it. As time passes less air is present in the packaged container and various volatile gases accumulate which in turn form various other substances in the container. This increases the chance of rot and disease so that the skins, meats, etc. of the fruit or vegetable become limp and discolor thereby decreasing their commercial value. Carbonic acid gas in these tightly closed containers is permitted to be present in amounts of about 2–10%, preferably about 3–7%. However if carbonic acid gas is present in these containers in amounts of 7% or more, aldehydes, alcohols, esters, ethylene as and additional carbonic acid gas are generated which lead to the undesirable effects described above. The generation of ethylene gas and alcohols unfavorably causes the fruit or vegetables to mature much faster, even in amounts of one to several hundreds ppm.

Normally the moisture content of the fruits and vegetables is about 70–95%, preferably about 75–90% in which amount the fruits or vegetables maintain their freshness. However if the moisture content of the fruits and vegetables reaches 95% or more, the moisture is supersaturated and water drops occur with the result that the fruits or vegetables are caused to ripen at a faster rate. On the other hand, in the case where the moisture content is 70% or less, moisture evaporates from the fruits and vegetables with the result that the fruits or vegetables lose weight, shrink and wilt resulting in a loss of freshness.

As can be discerned from the above, there is a close correlation between the freshness of the fruits and vegetables, and the presence of quantities of the various substances described above. The fruits and vegetables in a packaged container are kept fresh by controlling the presence of the quantities of the various substances in the container.

Heretofore, the art has disclosed the use of slaked lime, quick lime, magnesium hydroxide or barium hydroxide for the adsorption and absorption of carbonic acid gas; the use of zeolite, bentonite and active carbon for the adsorption and absorption of ethylene, aldehydes, alcohols, esters, etc., and the use of silica gel, activated clay and alumina gel for the adsorption and absorption of water vapor.

The methods disclosed in the prior art for retaining the freshness of the fruits or vegetables in a packaged container by placing a freshness retaining agent in the container utilizes the freshness retaining agent in a pouch of unwoven cloth. This method is time consuming in that the pouch must first be filled with the retaining agent and placed into the packaged container. A further disadvantage in using the above technique is that the flow of water vapor, carbonic acid gas, ethylene, etc. between the interior of the packaged container and the exterior atmosphere is severely restricted thereby placing an additional burden on the retaining agent which adsorbs and absorbs moisture, carbonic acid gas, ethylene gas, etc. in unnecessary quantities.

A further disadvantage of this technique is that the humidity unusually rises in the packaged container, especially during prolonged storage causing water drops to be formed on the surface of the fruits or vegetables, and the inner walls of packaged container, with the result that the fruits or vegetables degrade. In addition, this leads to favorable conditions for multiplication of the primary parasitic bacteria, which is the major cause for rot.

SUMMARY OF THE INVENTION

The present invention provides a plastic film packaging material comprising 100 weight parts of a polyethylene resin and 5 to 100 weight parts of an additive comprising a silica containing naturally porous material which is hydrophillic and which has a pore diameter of 15–200 A, a specific surface area of 110 to 130 $m^2/g$, voids of 40 to 50% and a specific gravity of about 1.2.

The packaging material of this invention can be formed in bags in which fruits or vegetables are tightly packaged to be kept fresh.

The polyethylene resins used according to the present invention are ethylene homopolymers, ethylene-alpha-olefin copolymers containing at least two carbon atoms, ethylene-vinyl acetate, copolymers and ethylene ethyl acrylate copolymers. Preferably the polyethylene resins are high-pressure low-density polyethylene, ethylene-vinyl acetate copolymer, ethylene ethyl acrylate copolymer, high-density polyethylene, vapor-phase linear low-density polyethylene and vapor-phase ultra low-density polyethylene.

The additive used in the present invention is a silica containing natural porous mineral. The preferred material is a silica containing a naturally porous material which is available from Frontier Co. Tana 3110, Sagamiharashi, Kanagawa, Japan under the trademark CRISBAL. CRISBAL has as its principle component CRISTOBALITE. It has pore diameters of about 15–200 A, specific surface areas of 110–130 $m^2/g$, voids of 40–50%, an apparent specific gravity of 1.2 and is hydrophilic. The gas adsorption of CRISBAL for hydrogen sulfide is about 30 times that of natural zeolite and is substantially equal to that of active carbon. Gas adsorption with ammonia is about 10 times (g/g) that of active carbon and zeolite, respectively, and its ammonia gas adsorption is about 30 times in volume (g/cm³) as much as active carbon.

The composition used to make the plastic film packaging material of this invention can contain various auxiliary materials used in commonly known resinous compositions. The auxiliary materials can be miscible thermoplastic resins, stabilizers, antioxidants, fillers, coloring agents, blowing agents, cross-linking agents, lubricants, workability reforming agents, antistatic agents, antihazing agents, anti-UV agents and are well known in the art.

According to the invention, 5 to 100 weight parts of CRISBAL preferably about 10 to 100 weight parts can be employed per 100 weight parts of the polyethylene resin.

When the CRISBAL amount is equal to or less than 5 weight parts, the resultant film does not satisfactorily retain the freshness of the fruits and vegetables.

Amounts of CRISBAL more than 100 weight parts, provide resultant films which have low strength and poor heat sealing qualities. Thus such films cannot be satisfactorily utilized for packaging bags.

The method of making the plastic film packaging material from the above described resinous composition can be selected from one of the known methods generally employed for making the thermoplastic resins into plastic film, specifically for making polyethylene into plastic film.

When packaging bags, for example, are made from the resinous composition, the composition is formed into a film tube by the inflation or T-die Technique. The film tube is thereafter cut into sections of the required size and heat sealed.

The thickness of the film can be varied over a relatively wide range for the intended applications preferably however the film thickness can range from about 0.02 to 1.5 mm.

A film thickness less than about 0.02 mm. results in films which lacks strength, and these packaging bags of the film sometimes break during transportation and handling.

A film thickness more than about 1.5 mm. result in film which are effective as a packaging material however they are uneconomical, from a commercial point of view.

The plastic film of the packaging material of this invention generally can be a single layer, however the film can be laminated to a film layer of a different polyethylene resin resulting in two layers for the purpose of reinforcing the film and consequently the bag strength. The bags of the plastic film packaging material of this invention retain the freshness of the fruit or vegetable contained therein for the following reasons.

1. It is preferable that the relative humidity in a bag packaging a fruit or vegetable be kept at about 70–95%. When the moisture in the packaging bag becomes excessive, the CRISBAL contained in the film adsorbs and absorbs the excess for dispersion outside of the bag. Conversely when the moisture in the packaging bag is lowered, the CRISBAL discharges the moisture it has adsorbed and absorbed, thereby keeping the relative humidity in the bag at the required 70–95%. At these relative humidities i.e., 70–95%, the fruit or vegetable maintains their freshness.

2. CRISBAL is particularly suitable for adsorbing and absorbing gases (carbonic acid gas, aldehydes, alcohols, esters, ethylene gas, etc.) which do harm to the freshness of the fruit or vegetable in the bag.

3. In the conventional methods of keeping the fruit or vegetable in the bag fresh by the use of an inorganic compound, the inorganic compound is placed in a pouch of unwoven fabric and placed in a packaging container. According to this invention, CRISBAL, a specific additive in the nature of a specific inorganic compound, is mixed in the film layer making up the packaging bag. There is no necessity for placing the pouch into the container thereby reducing labor. In addition, the fruit or vegetable in the bag is not easily damaged. Finally the moisture content can be adjusted far more efficiently than in the conventional methods.

The plastic film packaging material of this invention can be utilized to package fruits and vegetables for a relatively long period of time without suffering degradation in quality and thus has superior value.

The characteristics and effects of this invention will be explained in more detail with reference to the following examples of the invention, however the scope of the invention is not to be limited to the examples.

EXAMPLES

CRISBAL was added to a polyethylene resin and mixed homogeneously, or the powdered mixture of a polyethylene and CRISBAL was mixed homogeneously. The mixture was then formed into a tubular film by the inflation technique and the tubular film was formed into packaging bags. Fruits and vegetables were packaged in the bags for the freshness retaining test.

Tables 1, 2, and 3 show the resins used, their quantities, the quantities of CRISBAL, the quantities of fruits and vegetables, and the conditions of the fruits and vegetables.

TABLE 1

|  | Example 1 | Example 2 | Example 3 | Example 4 | Example 5 | Example 6 |
|---|---|---|---|---|---|---|
| Resin component 100 weight parts | Low-density*¹ polyethylene | Low-density polyethylene | Low-density polyethylene | Low-density polyethylene | Low-density polyethylene | Low-density polyethylene |
| Inorganic compound Addition (Wt. part) per resin component | CRISBAL*² 60 | CRISBAL 30 | CRISBAL 15 | CRISBAL 70 | CRISBAL 35 | CRISBAL 15 |
| Fruit or vegetable quantity (g) | Fresh mushrooms 800 | Fresh mushrooms 800 | Fresh mushrooms 800 | Fresh mushrooms 800 | Fresh mushrooms 800 | Fresh mushrooms 800 |
| Freshness and condition of fruit or vegetable. (Observed after | No water drop on inside surface of the bag, and surfaces of mushrooms and spinach. No change in apparent weight of mushrooms and spinach. No shrinkage nor rot observed. For examples 1–6 | | | | | |

TABLE 1-continued

|  | Example 1 | Example 2 | Example 3 | Example 4 | Example 5 | Example 6 |
|---|---|---|---|---|---|---|
| 30 days). | | | | | | |

*[1] NUC-9025 available from Nippon Unicar, Japan.
*[2] Made by Frontier
Packaging form: Tubular film of 15 cm-diameter and 0.2 mm-thickness was made. The film was cut off into 30 cm-lengths. Each length was sealed on one end to form a packaging bag.

TABLE 2

|  | Example 7 | Example 8 | Example 9 | Example 10 | Example 11 | Example 12 |
|---|---|---|---|---|---|---|
| Resin component 100 weight parts | Ethylene-ethyl acrylate copolymer*[3] | Ethylene-ethyl acrylate copolymer | Ethylene-ethyl acrylate copolymer | Ethylene-vinyl acetate copolymer*[4] | Ethylene-vinyl acetate copolymer | Ethylene-vinyl acetate copolymer |
| Inorganic compound | CRISBAL*[2] | CRISBAL | CRISBAL | CRISBAL | CRISBAL | CRISBAL |
| Addition (wt. part) per resin component | 60 | 30 | 15 | 70 | 35 | 15 |
| Fruit or vegetable quantity (g) | Fresh mushrooms 800 | Fresh mushrooms 800 | Fresh mushrooms 800 | Fresh mushrooms 800 | Fresh mushrooms 800 | Fresh mushrooms 800 |
| Freshness and condition of fruit or vegetable (Observed after 30 days) | No water drop on inside surface of the bag, and surfaces of mushrooms. No change in apparent weight of mushrooms. No shrinkage nor rot observed. For examples 7–12 | | | | | |

*[2] Made by Frontier
*[3] DPDJ-9169 available from Nippon Unicar
*[4] Available from Nippon Unicar.
Packaging form: Tubular film of 15 cm-diameter and 0.2 mm-thickness was made. The film was cut off into 30 cm-lengths. Each length was sealed on one end into a packaging bag.

TABLE 3

|  | Example 13 | Example 14 | Reference 1 | Reference 2 | Reference 3 | Reference 4 |
|---|---|---|---|---|---|---|
| Resin component 100 weight parts | Vapor-phase linear low-density polyethylene*[5] | Vapor-phase ultra low-density polyethylene*[6] | Ethylene-ethyl acrylate copolymer | Ethylene-vinyl vinyl acetate copolymer | Low-density polyethylene | Vapor-phase linear low-density polyethylene |
| Inorganic compound Addition (wt part) per resin component | CRISBAL*[2] 60 | CRISBAL 30 | None | None | None | None |
| Fruit or vegetable quantity (g) | Fresh mushrooms 800 | Fresh mushrooms 800 | Fresh mushrooms 800 | Fresh mushrooms 800 | Fresh mushrooms 800 | Fresh mushrooms 800 |
| Freshness and condition of fruit or vegetable | No water drop on inside surface of the bag, and surfaces of mushrooms. No change in apparent weight of mushrooms. For examples 13–14 No shrinkage nor rot observed. | | Water drops on inside surface of the bag For References 1–4 | | | |

*[2] Made by Frontier
*[5] Available from Union Carbide
*[6] Available from Union Carbide
Packaging form: Tubular film of 15 cm-diameter and 0.2 mm-thickness was made. The film was cut off into 30 cm-lengths. Each length was sealed on one end into a packaging bag.

What is claimed is:

1. A plastic film packaging material comprising 100 weight parts of a polyethylene resin and, 5 to 100 weight parts of an additive comprising a silica containing naturally porous material which is hydrophillic and which has a pore diameter of 15–200 A, a specific surface area of 110 to 130 m$^2$/g, voids of 40 to 50% and a specific gravity of about 1.2.

2. A plastic film packaging material according to claim 1 wherein the additive is employed in the amount of 10–100 weight parts based on 100 weight parts of polyethylene resin.

3. A plastic film packaging material according to claim 1 wherein said polyethylene resin is a low density polyethylene.

4. A plastic film packaging material according to claim 1 wherein said polyethylene resin is an ethylene ethyl acrylate copolymer.

5. A plastic film packaging material according to claim 1 wherein said polyethylene resin is an ethylene vinyl acetate copolymer.

6. A plastic film packaging material according to claim 1 wherein said polyethylene resin is a vapor phase linear low density polyethylene.

7. A plastic film packaging material according to claim 1 wherein said polyethylene resin is a vapor phase ultra low density polyethylene.

8. A packaging bag formed from the film packaging material of claim 1.

* * * * *